United States Patent
Guercioni (10) Patent No.: US 8,683,679 B2
(45) Date of Patent: Apr. 1, 2014

(54) APPARATUS FOR PRE-FORMING ELECTRICAL BAR CONDUCTORS, IN PARTICULAR FOR BAR WINDINGS OF ELECTRICAL MACHINES

(75) Inventor: Sante Guercioni, Teramo (IT)

(73) Assignee: Tecnomatic S.p.A., Teramo (IT)

( * ) Notice: Subject to any disclaimer, the term of this patent is extended or adjusted under 35 U.S.C. 154(b) by 0 days.

(21) Appl. No.: 13/387,723

(22) PCT Filed: Apr. 14, 2010

(86) PCT No.: PCT/IT2010/000160
§ 371 (c)(1),
(2), (4) Date: Jan. 27, 2012

(87) PCT Pub. No.: WO2011/128919
PCT Pub. Date: Oct. 20, 2011

(65) Prior Publication Data
US 2013/0019463 A1 Jan. 24, 2013

(51) Int. Cl.
*B23P 19/00* (2006.01)
*H02K 15/00* (2006.01)

(52) U.S. Cl.
USPC .................... 29/732; 72/213; 72/383; 72/386

(58) Field of Classification Search
USPC ............... 29/732, 596, 592.1, 825, 874, 882; 72/496, 857, 213, 383, 386; 439/213, 439/303, 383, 386
See application file for complete search history.

(56) References Cited

U.S. PATENT DOCUMENTS 5,897,394 A * 4/1999 Adachi .................... 439/496
6,314,780 B1 * 11/2001 Naka et al. ................ 72/213
7,480,987 B1 1/2009 Guercioni

FOREIGN PATENT DOCUMENTS

GB 1 496 445 12/1977
JP 2000 069722 3/2000

* cited by examiner

*Primary Examiner* — Thiem Phan
(74) *Attorney, Agent, or Firm* — Tarter Krinsky & Drogin LLP (57) ABSTRACT

A pre-forming apparatus (4) for an electrical bar conductor (8), comprising a punch (12) provided with moving members for exerting a thrust on the conductor (8) during the relative pre-forming, the punch (12) being axially sliding along a pre-forming direction (X-X) and being provided with a cursor (20) and with a pre-forming head (24) suitable for engaging with the conductor (8). The apparatus (4) comprises a first pre-forming chamber (44) suitable for being crossed by the conductor (8) and by the punch (12) during the forward movement of the punch (12) for the pre-forming operation.

15 Claims, 6 Drawing Sheets

APPARATUS FOR PRE-FORMING ELECTRICAL BAR CONDUCTORS, IN PARTICULAR FOR BAR WINDINGS OF ELECTRICAL MACHINES

CROSS REFERENCE TO RELATED APPLICATIONS

This application is based on International Application Application No. PCT/IT2010/000160, filed on Apr. 14, 2010, the contents of which are incorporated herein by reference.

The present specification relates to an apparatus for pre-forming electrical bar conductors, in particular for bar windings of electrical machines, and the relevant pre-forming method.

In particular, the components of electrical machines, such as stators and rotors, comprise electrical bar conductors suitably coated, for example enamelled, with electrically insulating material, bent and variedly connected to each other so as to form so-called bar windings.

Bar windings are known in the art, which are made of electrical bar conductors having an essentially rectangular cross section, where by rectangular it is meant both the square section and the "flat" section by which it is generally meant a rectangular-shaped section wherein one of the two sides of the section is shorter than the other one.

The above bar conductors are usually preformed by a 'U' or 'P' bending starting from straight bar conductors, as better described hereinafter, so as to be suitably inserted into special radially aligned slots obtained in a forming device suitable for twisting, after the insertion, the above preformed conductors. In the practice, such forming device essentially serves for "spreading" the arms of the "U" or "P" shape so that the two arms of a same conductor, after having removed the latter from the forming device, may then be inserted into slots of a stator or rotor core radially offset relative to each other by at least one predetermined pitch.

It is known in the art to perform the pre-forming of the electrical conductors by machinery that bends the same by suitable forming tools so as to plastically bend the same conductors.

The bending operation is quite delicate since predetermined geometric tolerances must be observed while ensuring high forming speeds. Moreover, attention should be paid to avoid damaging by abrasion the insulating coating that covers the same conductors which would otherwise be rejected as they would not ensure the electrical insulation anymore.

The prior art solutions do not always allow obtaining at the same time speed, forming accuracy and reliability in terms of integrity of the outer coating.

Irrespective of the problems mentioned above, moreover, in some situation it may be desirable to obtain a pre-forming of the conductor operating on the same working surface as any processing operations preceding the pre-forming, such as cutting the conductors starting from a coil and peeling defined and selected portions of the bar conductor ends. U.S. Pat. No. 7,480,987) describes a method for pre-forming bar conductors (in this document called "hairpin conductors"). As may be seen, in this document the bending of the bar conductors from the rectilinear to a "U" or "P" shape (FIG. 10a and relative description of U.S. Pat. No. 7,480,987) is such as to rotate the orientation of the bar conductor from an initial orientation parallel to the working surface to a final orientation perpendicular to the working surface.

The object of the present specification is to provide an apparatus which should be such as to solve the drawbacks and/or the requirements mentioned with reference to the prior art.

Such drawbacks and/or requirements are solved by a pre-forming apparatus as defined in the annexed claim 1 and by a pre-forming method as described herein.

Other embodiments of the present invention are described in the subsequent claims.

Further features and the advantages of the present invention will appear more clearly from the following description of preferred non-limiting embodiments thereof, wherein.

Elements or parts of elements in common between the embodiments described below are referred to with the same reference numerals.

With reference to the annexed figures, reference numeral 4 globally indicates an apparatus for pre-forming an electrical bar conductor 8, for example with rectangular, flat or square cross section.

For the purposes of the present specification, pre-forming means the operation of processing a linear bar conductor for obtaining a conductor shaped as a "P" or "U". As known, such operation may be preceded by other pre-forming operations, such as the straightening for the unwinding from a conductor coil, the peeling of selected conductor regions and cutting. All of the above operations are called pre-forming as they represent operations for arranging a bar conductor prior to the subsequent forming operation, or twisting, which as already explained in the introductory part of the present specification essentially consists of a spreading such conductor is subject to before being inserted in a core, so that the two arms of the "P" and of the "U" may be inserted into radially offset slots of the core.

For the purposes of the present description, "flat" or "square" bar conductor indicates a bar conductor having four substantially flat sides, each connected to adjacent sides, typically by a rounded edge.

Therefore, the words "flat" or "square" or equivalent words used to describe the cross section of a bar conductor are used in a general meaning and should not be interpreted to exclude the fact that such bar conductors have considerably rounded edges that connect the substantially flat sides. The expression "flat conductor" should be construed as meaning that the conductor has two opposite sides the distance whereof is greater than the distance between the two remaining opposite sides. For the purposes of the present description, the expression "rectangular conductor" should be construed as a generalisation for a flat conductor and a square conductor, the square conductor being a particular case of rectangular conductor, wherein the four sides have equal dimensions.

In any case, the present specification may be applied to any type of electrical bar conductor also having, for example, circular section.

Hereinafter, reference shall be made to a flat bar conductor and it will be assumed that such conductor will be bent about a bending axis parallel to the short side.

The bar conductor is for example a conductor comprising a copper core and an insulating enamel coating.

The pre-forming apparatus 4 of the present description may be, without distinction, an independent machine or a workstation of a system for producing a component of an electrical machine such as a stator or a rotor.

According to an embodiment, the pre-forming apparatus 4 represents the final stage of a pre-forming machine, for example but without limitations, as described in U.S. Pat. No. 7,480,987, wherein apparatus 4 of the present description would replace the "BEND" stage of such machine intended for the "P" or "U" bending of previously peeled and cut bar conductors.

According to an embodiment, apparatus 4 comprises a punch 12 provided with respective moving members for exerting a thrust on conductor 8 during the relative pre-forming.

Punch 12 is axially sliding along a pre-forming direction X-X; preferably, apparatus 4 is provided with at least one moving arm 16, suitable for imparting the translatory movement to punch 12.

According to an embodiment, punch 12 is provided with a cursor 20 connected to the moving arm 16 and which supports a pre-forming head 24 suitable for interfacing with conductor 8.

The moving arm 16 is operatively connected to the moving members and the pre-forming head 24 is suitable for engaging directly with a portion of conductor 8 so as to induce the pre-forming thereof, as better explained hereinafter.

For example, the moving arm 16 is operatively connected to a mechanical cam (not shown) that turnably moves in a continuous manner so as to impart a rectilinear alternating movement to the moving arm 16. Said rectilinear alternating movement allows the pre-forming head 24 to perform a pre-forming stroke during which, as better described hereinafter, it carries out the pre-forming of conductor 8 and a retraction stroke during which it retracts to reposition in the proximity of a subsequent conductor 8 to be preformed.

In particular, conductor 8 fed to the pre-forming apparatus 4 is a linear element arranged along a cross direction Y-Y, perpendicular to said pre-forming direction X-X. Preferably, conductor 8 is arranged symmetrically, or substantially symmetrically relative to punch 12: in other words, a centre line M of conductor 8 is arranged so as to be aligned and symmetrical, or substantially aligned and symmetrical, relative to punch 12, and in particular relative to the pre-forming head 24. The above arrangement "substantially aligned and symmetrical" for the purposes of the present description should be construed to mean that, for the need of having to obtain a "U" or "P" preformed conductor wherein one of the two arms of the "U" or of the "P" has a length differing froth the other, an arrangement may be provided that is not exactly symmetrical but staggered by an equal amount to obtain a desired length difference between the two arms.

Moreover, conductor 8 is arranged perpendicular to punch 12.

According to an embodiment, the pre-forming head 24 is shaped as a fork so as to hook and keep hooked conductor 8 during the movement of punch 12 for pre-forming conductor 8.

In particular, the pre-forming head 24 comprises a fork portion 28 having a pair of branches 32 opposite to each other relative to a grasping direction, perpendicular to the cross direction Y-Y and to the pre-forming direction X-X, so as to determine a seat 36 open towards the associable conductor 8.

In this way, during a pre-forming stroke, wherein punch 12 moves along the pre-forming direction X-X to bend conductor 8, the fork portion 28 ensures the hooking with conductor 8; at the same time, during the retraction stroke, wherein punch 12 retracts at the end of the pre-forming of conductor 8, the automatic release or disconnection of the pre-forming head 24 from conductor 8 is obtained.

Branches 32 of the fork portion 28 are connected for defining an abutment 40 in the insertion of conductor 8 between branches 32 of the pre-forming head 24.

Preferably, branches 32 extend cantilevered relative to abutment 40 by a length at least equal to the width of conductor 8, the width being measured relative to the pre-forming direction X-X. In this example, such width is equal to the size of the longer side of the rectangular section of conductor 8.

In this way, branches 32 ensure that conductor 8, during the pre-forming, cannot rotate relative to an axis parallel to the cross direction Y-Y.

According to an embodiment, cursor 20 comprises a guiding protrusion 14 facing the pre-forming head 24 and provided for stabilising the rectilinear trajectory of the latter. The guiding protrusion 14 is slidingly received in a guiding groove 26 provided in apparatus 4.

Apparatus 4 comprises a first pre-forming chamber 44 suitable for being crossed by conductor 8 and by punch 12 in an initial step of the pre-forming operation. According to an embodiment, the guiding groove 26 crosses the first pre-forming chamber 44 from the inlet to the outlet.

According to an embodiment, the first pre-forming chamber 44 comprises a pair of support elements 48 that define each a support shoulder for conductor 8 perpendicular to the pre-forming direction X-X, and opposite punch 12.

The support elements 48 are separate and spaced from each other relative to the cross direction Y-Y so as to define an opening 52 suitable for housing conductor 8 and the pre-forming head 24 during the pre-forming operation. Preferably, opening 52 is aligned with punch 12 relative to the cross direction Y-Y; moreover, as already described, conductor 8 is arranged at the inlet of the first pre-forming chamber 44 so that centre line M of the conductor coincides, or substantially coincides, with a symmetry plane of opening 52.

According to an embodiment, the first pre-forming chamber 44 comprises an outlet guide 46 immediately adjacent, in the pre-forming direction X-X, to the support elements 48 and intended for being crossed by conductor 8. Preferably, such outlet guide 46 has a width (measured in the cross direction Y-Y) at least slightly larger than the minimum distance between the support elements 48. According to an embodiment, the outlet guide in the practice is a channel horizontally (cross direction Y-Y) and vertically (direction perpendicular to directions Y-Y and X-X) segregated. The vertical segregation is almost total except for an upper and lower cut 47 provided in the outlet guide 46 but also in general in the first pre-forming chamber 44, for the passage of the pre-forming head 24 and of the relative guiding protrusion 14 which in the practice are such as to cross the first pre-forming chamber 44.

According to an embodiment, at the inlet of the first pre-forming chamber 44 there is provided a horizontal recess 42, therefore segregated vertically, which acts as seat for positioning and aligning conductor and serves for preventing any undesired deformations thereof in vertical direction which may produce under the thrust action of the forming head.

Preferably, the support elements 48 are pairs of rotating rollers 56, for example two bearings, relative to rotation axes perpendicular to the cross direction Y-Y and to the pre-forming direction X-X, so as to rotate under the thrust of conductor 8 during its introduction and crossing of the first pre-forming chamber 44.

The pre-forming of conductor 8 is substantially carried out inside the first pre-forming chamber 44: in fact, at the outlet from the first pre-forming chamber 44, conductor 8 is bent substantially as a 'U' so that two sides or 'arms 72 of conductor are oriented parallel to the pre-forming direction X-X, said' sides 72 being connected to each other at a curved portion 76, whereat the pre-forming head 24 engages with conductor 8.

According to an embodiment, apparatus 4 comprises, in output from the first pre-forming chamber 44, a second pre-forming chamber 64 suitable for housing conductor 8 previously bent in the first forming chamber 44.

The second pre-forming chamber 64 comprises an inlet arranged symmetrically relative to punch 12 and relative to opening 52 of the first forming chamber 44.

Preferably, said inlet 66 has a cross-width greater than or equal to the cross width of opening 52, transversally delimited by the support elements 48. In other words, conductor 8, after having been preformed in the first pre-forming chamber 44 is ejected from the latter and made to pass inside the second pre-forming chamber 64 substantially with clearance, so as to not undergo abrasions and/or damages of the insulation during the introduction and sliding in the second pre-forming chamber 64.

By cross width it is meant the width measured parallel to the cross direction Y-Y.

According to an embodiment, the second pre-forming chamber 64 comprises at least one pair of side walls 68 opposite relative to said cross direction Y-Y and suitable for delimiting the cross position of conductor 8 in a bent configuration within the second pre-forming chamber 64.

Figure 1:
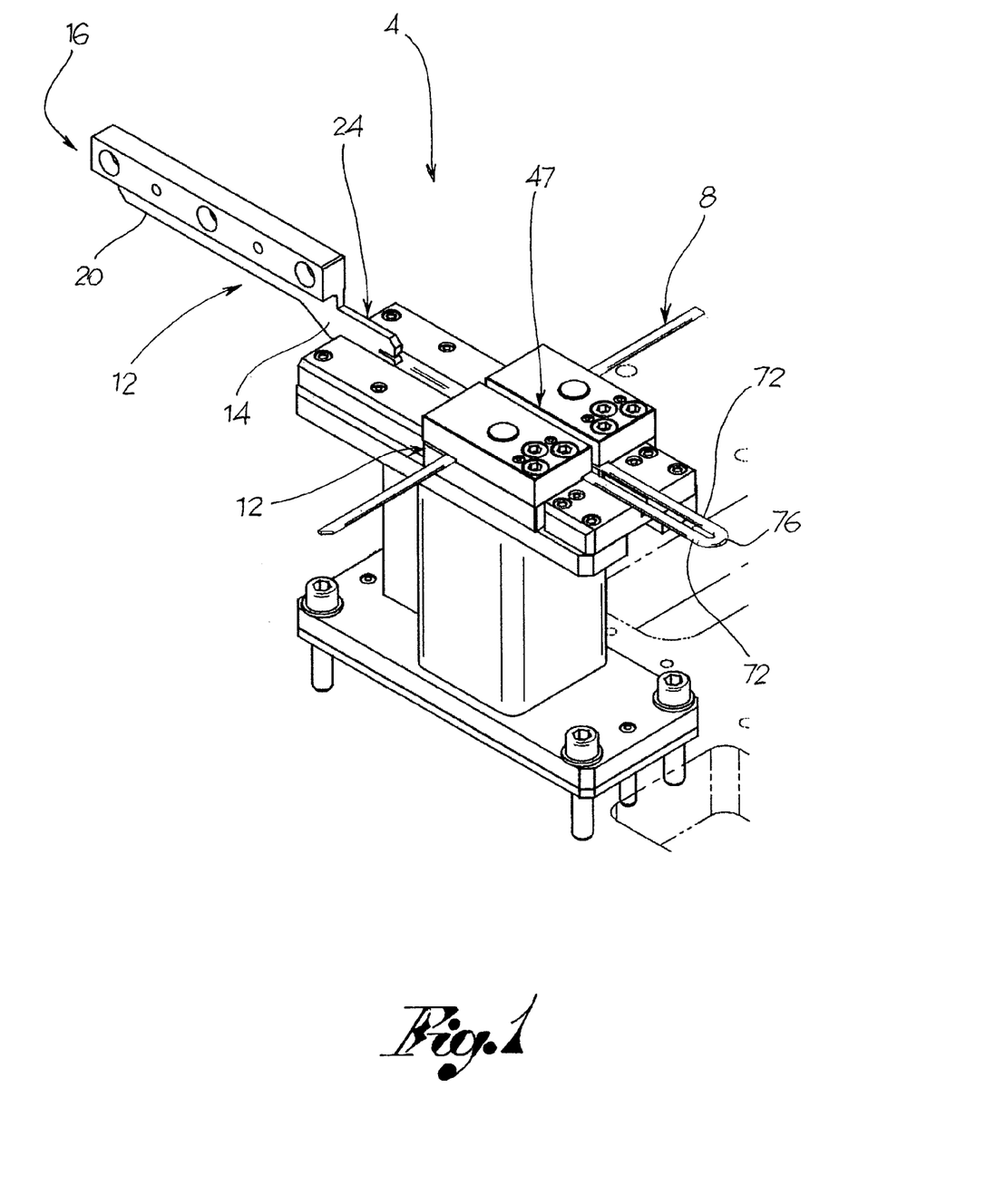
FIG. 1 shows a perspective view of an embodiment of a portion of pre-forming apparatus according to the present specification.
Figure 2:
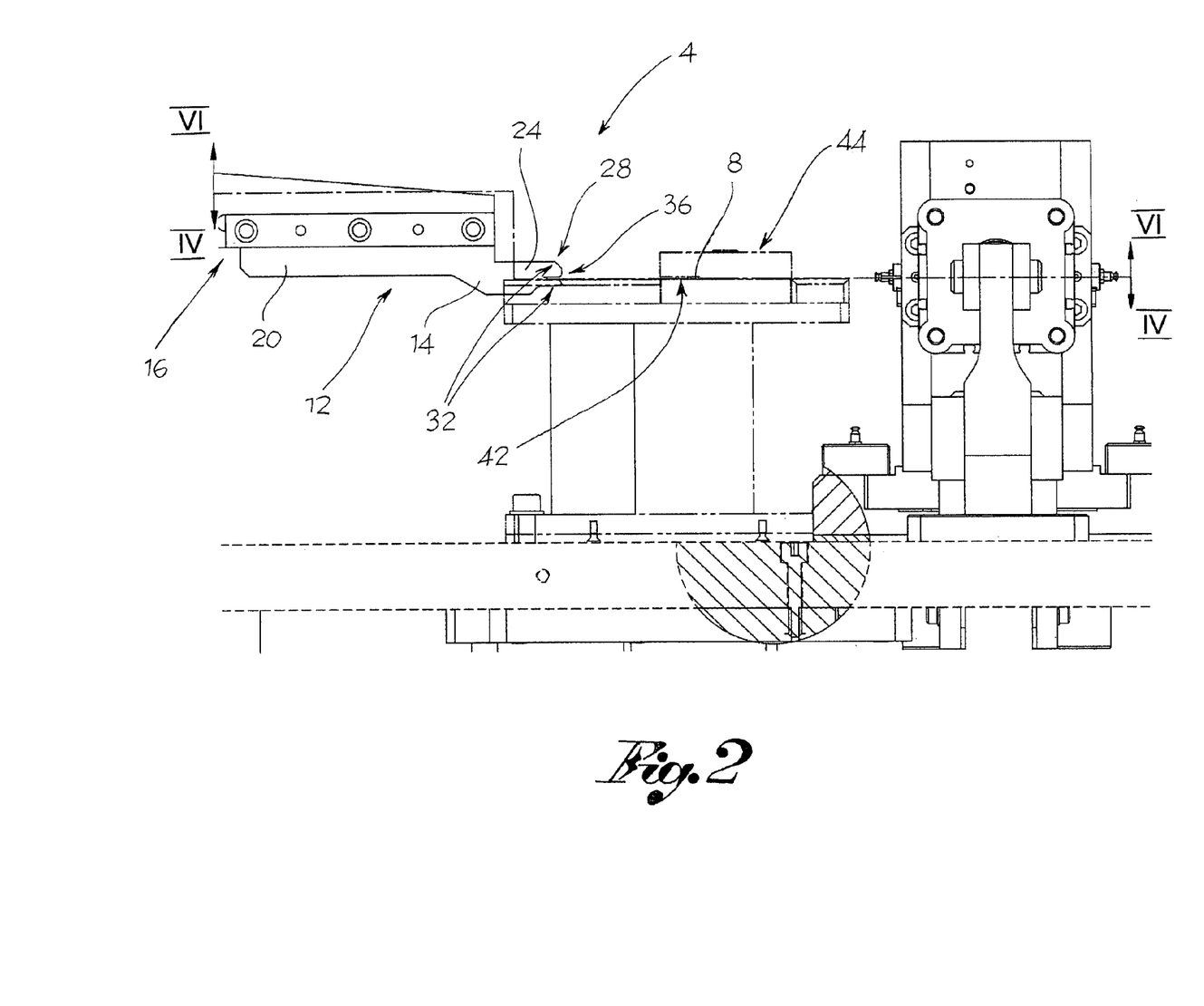
FIG. 2 shows a side view of the apparatus of FIG. 1 in a first step of the pre-forming process.
Figure 3:
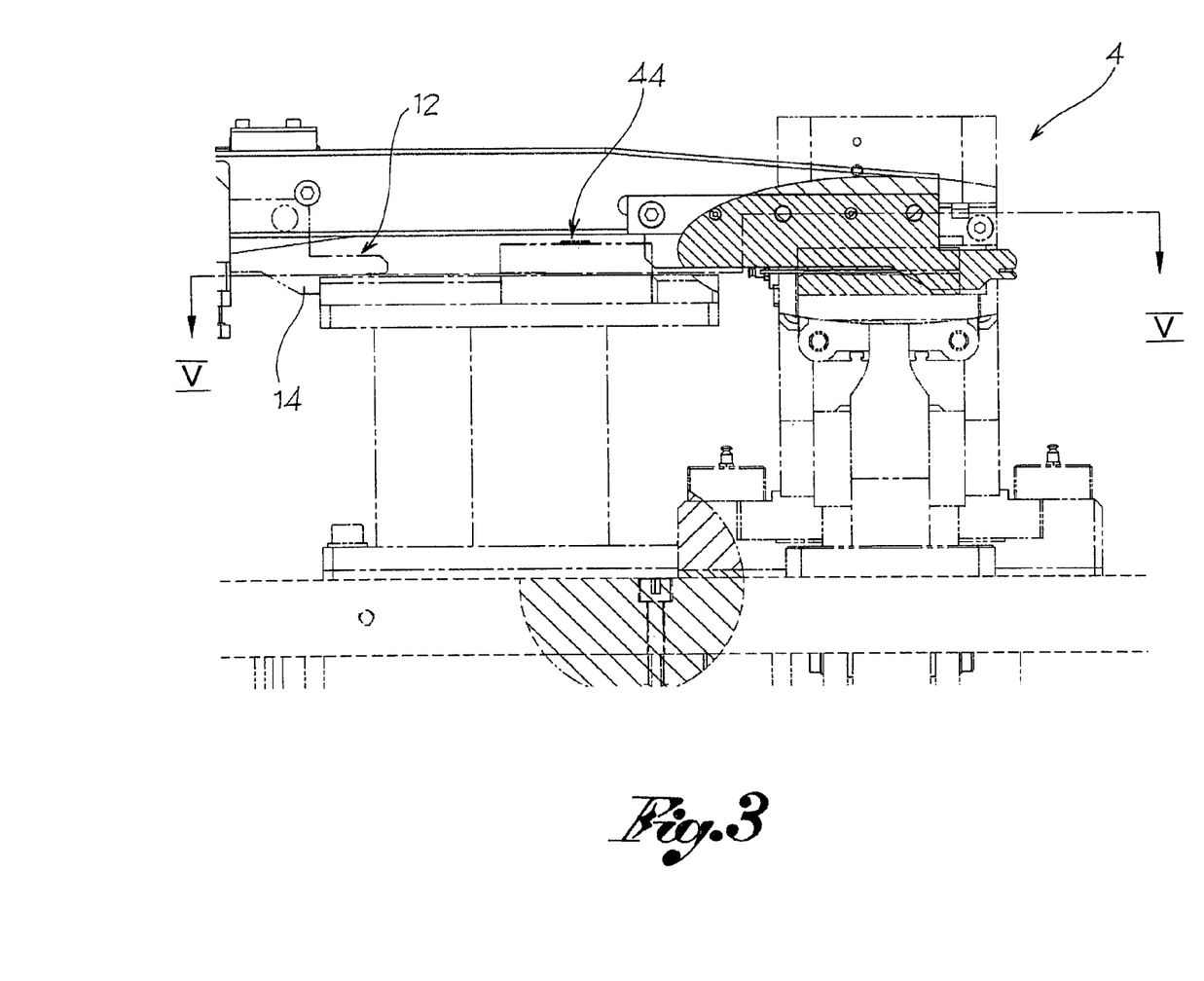
FIG. 3 shows a side partly cutaway view of the apparatus of FIG. 1 in a second step of the pre-forming process.
Figure 4:
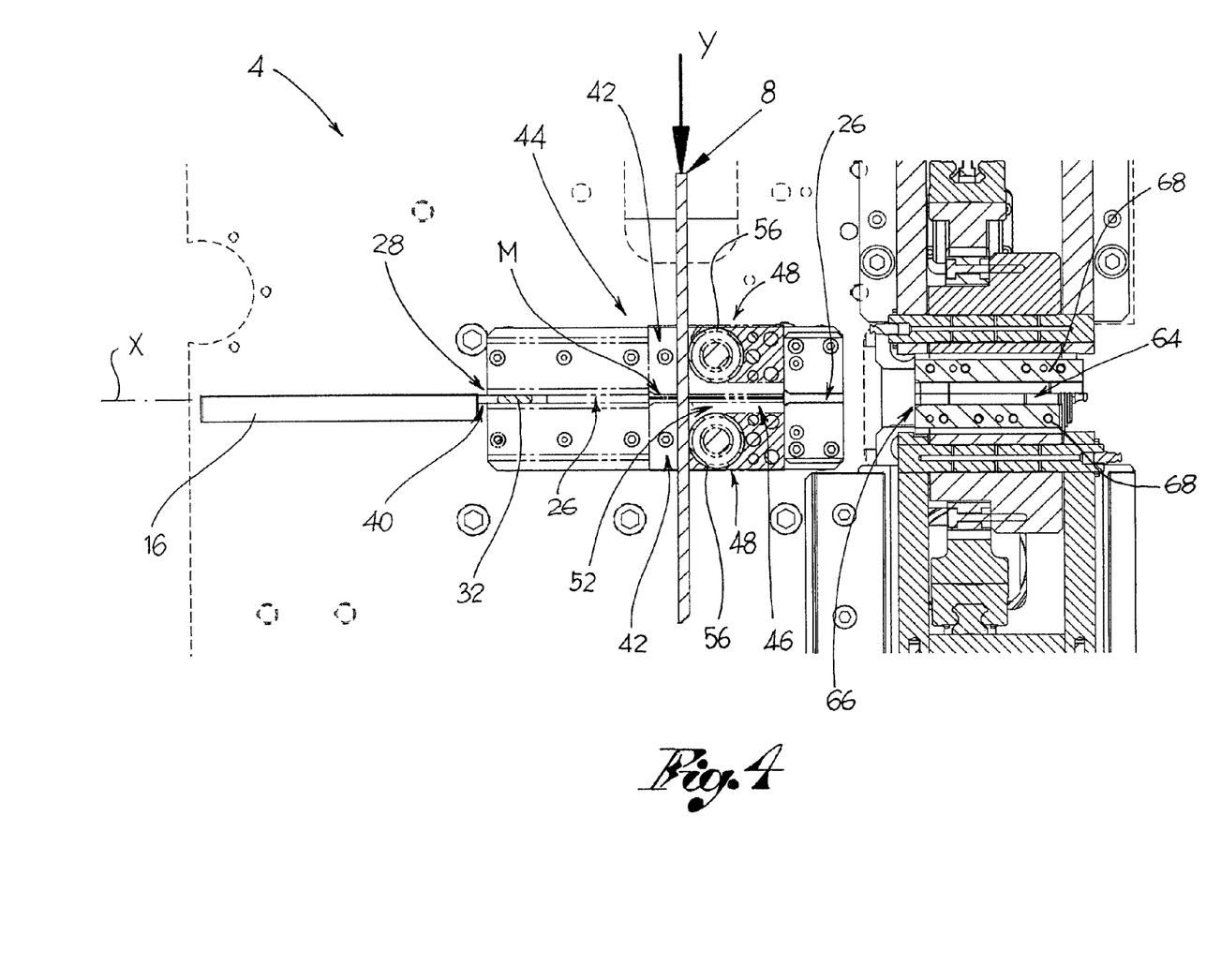
FIG. 4 shows a cutaway view of the apparatus of FIG. 1, along the section line IV-IV of FIG. 2.
Figure 5:
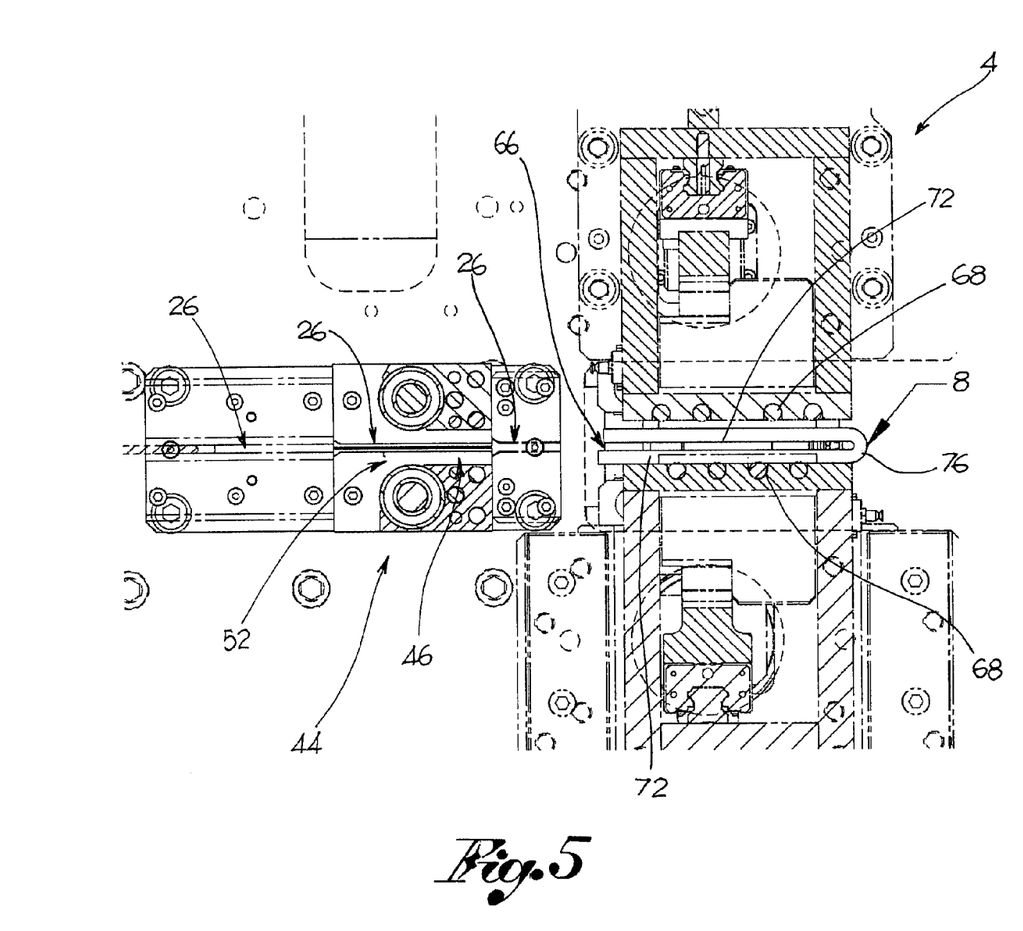
FIG. 5 shows a cutaway view of the apparatus of FIG. 1, along the section line V-V of FIG. 2.
Figure 6:
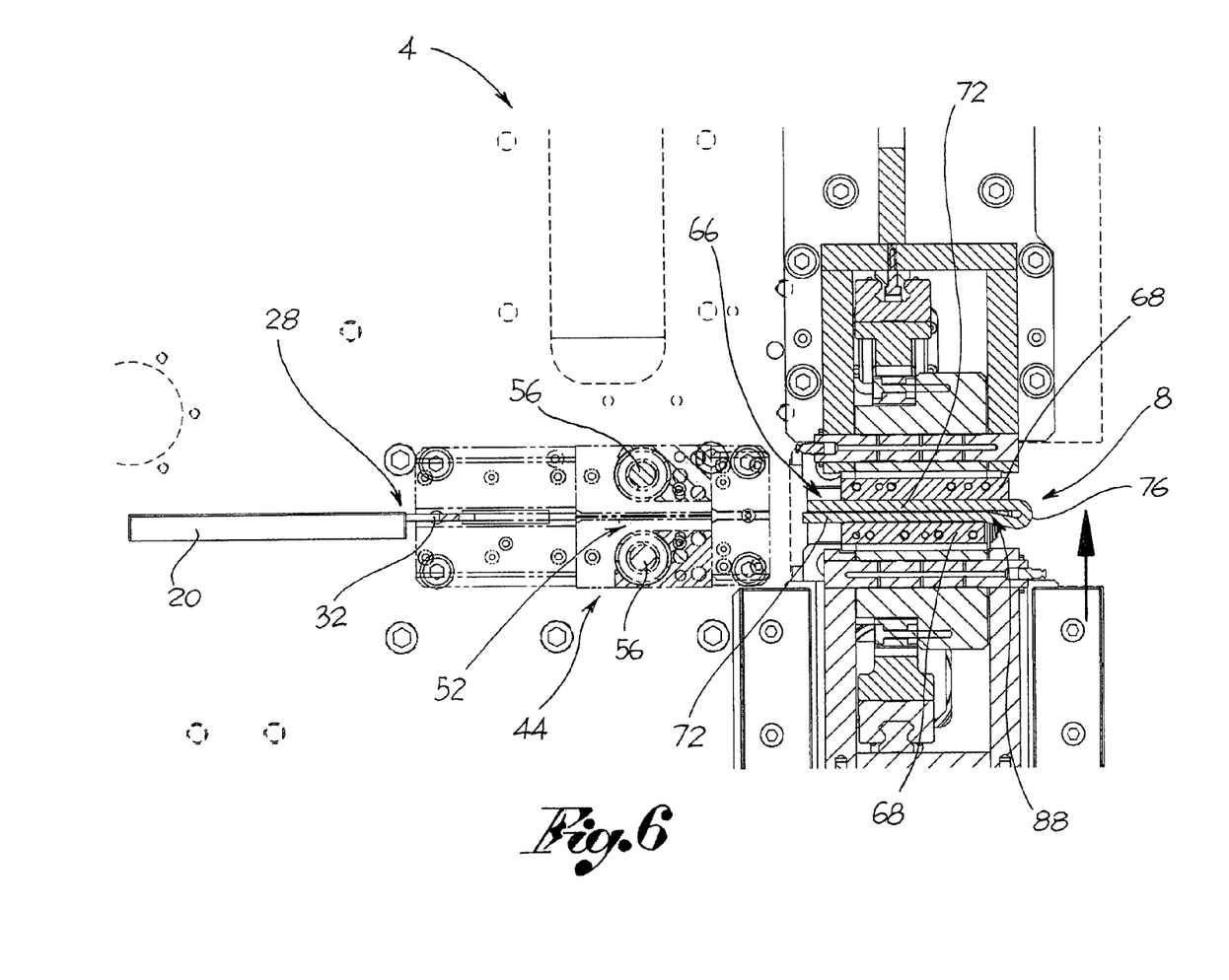
FIG. 6 shows a cutaway view of the apparatus of FIG. 1, along the section line VI-VI of FIG. 2, in a subsequent step of the pre-forming process.

Preferably, at least one of said side walls 68 is mobile parallel to the cross direction Y-Y so as to allow the cross pressing of conductor 8 in a bent configuration, for making a recess 88 at the curved portion 76 of conductor 8 (FIG. 6).

Preferably, the pre-forming apparatus 4 comprises grippers located on a specific moving member or similar gripping devices for gripping and shifting conductor 8 from the second pre-forming chamber 64 up to allow the ejection and/or the passage thereof to an optional further workstation.

The method for pre-forming a conductor according to the present invention shall now be described.

In particular, conductor 8 is fed according to the cross direction Y-Y so as to be positioned on the first pre-forming chamber 44.

Conductor 8 is made to rest on the support elements of the first pre-forming chamber 44, opposite the second pre-forming chamber 64.

In this way, a substantially central portion of the conductor is arranged cantilevered between the support elements 48 so as to be deformed under the thrust action of punch 12.

Preferably, conductor 8 is arranged in the positioning seat 42 symmetrically, or substantially symmetrically, with respect to opening 52 delimited by said support elements 48.

Punch 12 provided with the pre-forming head 24 is then made to advance so as to initially hook conductor 8 according to the pre-forming direction X-X.

The thrust action of punch 12 forces conductor 8 to bend so as to entirely pass, along with the pre-forming head 24, through the support elements 48, until it is released therefrom and coming out of the first pre-forming chamber 44 in a preformed configuration after having crossed the outlet guide 46.

In particular, conductor 8 bends relative to the curved portion 76 whereat the same conductor 8 is hooked by the fork portion 28 of the pre-forming head 24, taking a 'U' configuration having two sides 72 parallel to one another and to the pre-forming direction X-X.

The pre-forming head 24 can then be retracted so as to release conductor 8 thus preformed, eject the bent conductor 8 and load a new rectilinear conductor 8 to bend through a new forming stroke of punch 12.

Optionally, after having bent the conductor as a 'U', advance at least one of the side walls 68 along a direction parallel to the cross direction Y-Y so as to obtain recess 88 at the curved portion 76 of conductor 8 (FIG. 6).

According to a further embodiment, moreover, it is possible to provide that in the return path thereof, the guiding protrusion 14 and the pre-forming head 24, or in general punch 12 are lifted at least by an amount sufficient for going beyond an optional new conductor 8 to be preformed in the meantime already loaded in the positioning seat 42.

As can be appreciated from the description, the apparatus and the pre-forming method according to the invention allow overcoming the disadvantages of the prior art.

In particular, the conductor pre-forming operation is very quick and accurate as far its execution is concerned.

The conductor coating is not abraded or damaged during the pre-forming and the apparatus therefore exhibits highly reduced production scrap.

In particular, the integrity of the conductor coating is, ensured by the fact that, thanks to the presence of the turning rollers arranged between the conductor and the apparatus, rolling and not sliding friction is always exerted during the pre-forming operations: in this way, any abrasion of the conductor coating is prevented.

The pre-forming operation is very accurate since the conductor is always guided and contained by the first pre-forming chamber during all the pre-forming steps: in other words, the conductor deformation always takes place in a controlled manner so as to prevent any undesired deformation of the same conductor that would cause the relative discard.

A man skilled in the art may make several changes and adjustments to the apparatus and methods described above in order to meet specific and incidental needs, all falling within the scope of protection defined in the following claims.

The invention claimed is:

1. Pre-forming apparatus for an electrical bar conductor of an electrical bar winding, comprising:
   a punch provided with moving members for exerting a thrust on the conductor during the relative pre-forming,
   the punch being in contact with a guiding groove on a surface of the apparatus and axially sliding along the guiding groove in a pre-forming direction (X-X),
   the punch being provided with a cursor connected to a moving arm and with a pre-forming head suitable for engaging with the conductor,
   the conductor, in pre-forming conditions, being a linear element arranged along a cross direction (Y-Y), perpendicular to said pre-forming direction (X-X),
   the apparatus comprising a first pre-forming chamber suitable for being crossed by the conductor and by the punch during the advance of the punch as it axially slides along the guiding groove for the pre-forming operation,
   wherein the forming head is comprises a fork portion so as to hook and keep the conductor hooked during the displacement of the punch for pre-forming the conductor.

2. Apparatus according to claim 1, fork portion comprises a pair of branches opposite to each other relative to a gripping direction, perpendicular to said cross direction (Y-Y) and to the forming direction (x-X), so as to determine a seat open towards the associable conductor so as to release from the conductor subsequent to the retraction of the forming head.

3. Apparatus according to claim 2, wherein said branches are connected for defining an abutment in the insertion of the conductor between the branches of the forming head.

4. Apparatus according to claim 3, wherein said branches extend cantilevered relative to the abutment by a length at least equal to the width of the conductor, said width being measured relative to the pre-forming direction (X-X).

5. Apparatus according to claim 1, wherein the first pre-forming chamber comprises a pair of support elements that define each a support shoulder for the conductor perpendicular to the forming direction (X-X), and opposite the punch.

6. Apparatus according to claim 5, wherein said support elements are pairs of rotating rollers relative to rotation axes perpendicular to the cross direction (Y-Y) and to the forming direction (X-X), so as to rotate under the thrust of the conductor during the pre-forming thereof.

7. Apparatus according to claim 5, wherein said support elements are separate and spaced from each other relative to the cross direction (Y-Y) so as to define an opening suitable for housing the conductor and the forming head during the pre-forming operation.

8. Apparatus according to claim 7, wherein the opening is aligned with the punch relative to the cross direction (Y-Y) and the conductor is arranged at the inlet of the first pre-forming chamber so that centre line (M) of the conductor coincides, or substantially coincides, with a symmetry plane of the opening.

9. Apparatus according to claim 5, wherein the first pre-forming chamber comprises an outlet guide immediately adjacent, in the pre-forming direction (X-X), to the support elements and intended for being crossed by the conductor, said outlet guide being a vertically segregated channel, relative to a direction perpendicular to directions (Y-Y) and (X-X) except for a cut suitable for allowing the passage of the pre-forming head.

10. Apparatus according to claim 1, wherein the cursor comprises a guiding protrusion facing the pre-forming head, said guiding groove being slidingly received in the guiding groove so as to stabilise the rectilinear trajectory of the pre-forming head.

11. Apparatus according to claim 7, wherein at the inlet of the first pre-forming chamber there is provided a horizontal recess segregated vertically, which acts as seat for positioning and aligning the conductor and serves for preventing any undesired deformations thereof in vertical direction (Y-Y) which may produce under the thrust action of the pre-forming head.

12. Apparatus according to claim 1, comprising, in output from the first pre-forming chamber, a second pre-forming chamber suitable for housing the conductor previously bent in the first pre-forming chamber.

13. Apparatus according to claim 12, wherein the second pre-forming chamber comprises an inlet arranged symmetrically relative to the punch and relative to the opening of the first forming chamber, said inlet having a cross width greater than or equal to the cross width of the opening.

14. Apparatus according to claim 12, wherein the second pre-forming chamber comprises at least one pair of opposite side walls suitable for delimiting the cross position of the conductor in a bent configuration, within the second pre-forming chamber.

15. Apparatus according to claim 14, wherein at least one of said side walls is mobile parallel to the cross direction (Y-Y) so as to allow the cross pressing of the conductor in a bent configuration, for making a recess at a curved portion of the conductor.

\* \* \* \* \*